March 13, 1956   A. H. RICE   2,737,741
MAP HOLDER FOR VEHICLES
Filed Feb. 14, 1952

Archie H. Rice
INVENTOR.

BY
Attorneys

United States Patent Office 2,737,741
Patented Mar. 13, 1956

2,737,741

MAP HOLDER FOR VEHICLES

Archie H. Rice, Santa Maria, Calif.

Application February 14, 1952, Serial No. 271,622

2 Claims. (Cl. 40—10)

This invention relates in general to map holders, and more specifically to map holders for mounting in vehicles for conveniently reading road maps.

The primary object of this invention is to provide an improved map holder which may be conveniently mounted within a vehicle in order to clearly read a road map, said map holder being provided with an enlarging lens to order to more clearly bring out the details of the road map.

Another object of this invention is to provide an improved map holder which is provided with a flat transparent sleeve for retaining a map therein, said sleeve underlying a magnifying lens for enlarging a limited portion of the road map.

Another object of this invention is to provide an improved road map holder having a magnifying lens mounted therein in overlying relation to a road map, said magnifying lens being provided with means for illuminating same in order to read the map in the dark.

Another object of this invention is to provide an improved means for reading a road map, said means including a map support mounted behind the dash of a vehicle, said support including a magnifying lens which is in direct alignment with the viewer plate mounted in the dash of the vehicle, said support also being provided with drive means for sliding the road map with respect to the support and its associated magnifying lens.

Another object of this invention is to provide an improved map holder which may be easily mounted on a conventional vehicle in a convenient position.

Another object of this invention is to provide an improved map holder of simple and compact construction and made of relatively inexpensive material whereby it may be economically manufactured.

A further object of this invention is to provide an improved map holder which may be conveniently secured to a vehicle adjacent the driver's set, said map holder being provided with an illuminating magnifying lens, said lens being electrically illuminated by lights connected to the wiring system of the vehicle.

Figure 1:
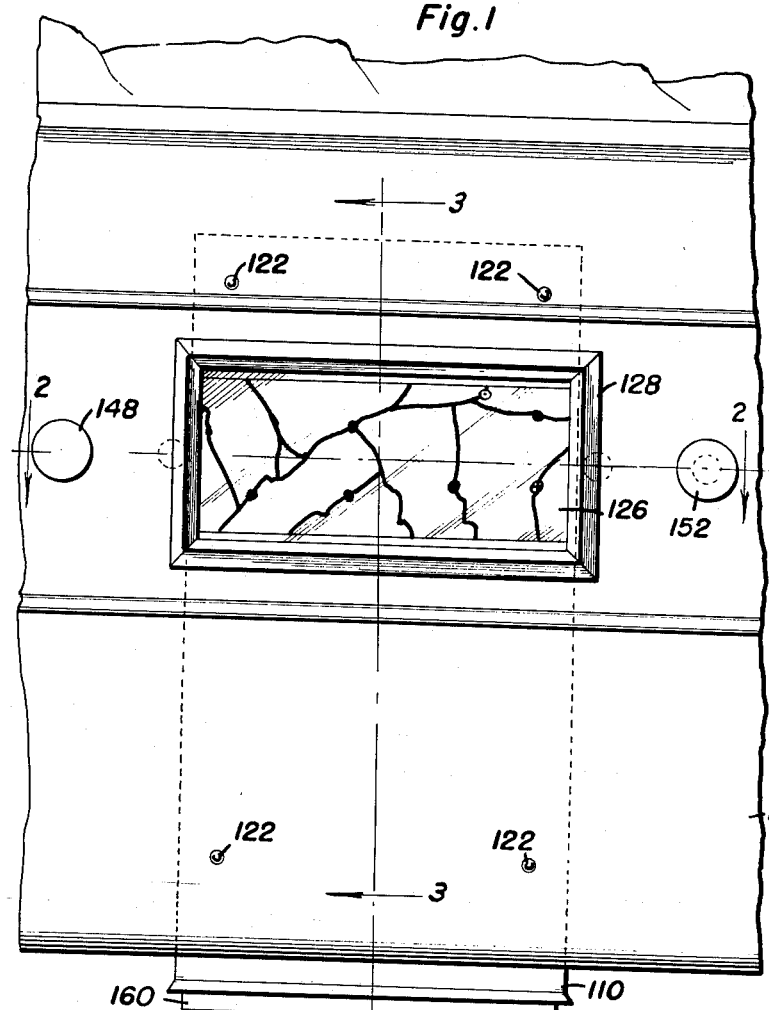
Figure 3:
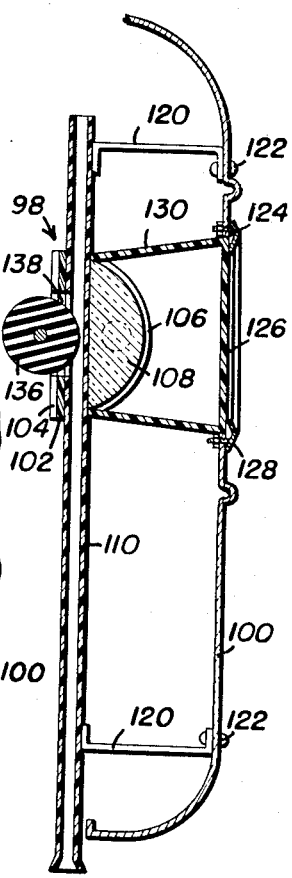
Figure 2:
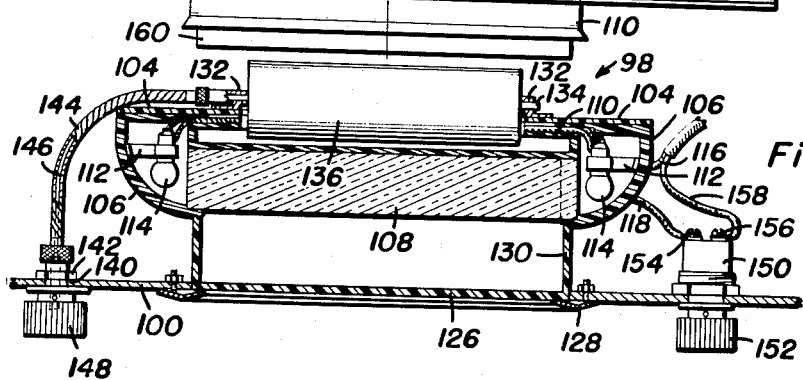

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is a fragmentary elevational view of a dash of a vehicle, said dash having mounted therein one form of road map holder and viewer;

Figure 2 is a transverse horizontal sectional view taken substantially upon the plane indicated by the section line 2—2 of Figure 1 and shows the general construction of the road map holder including means for moving the road map with respect to a magnifying lens; and Figure 3 is a transverse vertical sectional view taken substantially upon the plane indicated by the section line 3—3 of Figure 1 and showing the relationship of the means for moving a map with respect to its holder, and the means for securing the map holder to the rear of the dash.

Similar character of reference designate similar or identical elements and portions throughout the specification and throughout the different views of the drawings.

Referring now to Figures 1, 2 and 3 in particular, it will be seen that there is illustrated a form of road map holder referred to in general by the reference numeral 98 and mounted in the conventional dash 100 of a vehicle. The road map holder 98 includes a main supporting plate 102 to which are secured second plates 104 and having housings 106 mounted on their front surfaces. Extended between and secured to the housings 106 is a magnifying lens 108. Disposed between the main supporting plate 102 and the magnifying lens 108 is a flat tubular transparent sleeve 110 rigidly secured to the main supporting plate 102.

Carried by the housings 106 are clips 112 in which are removably secured electric lights 114. Connected to the terminals of the light 114 are wires 116 and 118. The circuit of the wires will be explained in detail hereinafter.

The transparent sleeve 110 is provided with transversely extending channel members 120 adjacent its upper and lower ends, the forward end of the transversely extending channel members 120 being secured to the rear of the dash 100 by conventional fasteners 122.

The dash 100 is provided with a substantially rectangular opening 124 in which is mounted a viewer plate 126. The viewer plate 126 is in spaced relation with the magnifying lens 108 and retained within the opening 124 in the dash 100 by a frame 128. Extending between the magnifying lens 108 and a viewer plate 126 is a substantially rectangular sleeve 130 in order to confine the light reflecting through the magnifying lens 108. The sleeve 130 is connected at its rear end to the transparent sleeve 110 for receiving a road map, and at its forward end to the viewer plate 126.

Referring now to Figure 2 in particular, it will be seen that secured to the rear of the second plates 104 are a pair of spaced aligned journals 132. Rotatably mounted within the journals 132 is a shaft 134 on which is visibly mounted a rubber roller 136. The rubber roller 136 extends through an opening 138 in the second plates 104, the main support plate 102 and the rear portion of the transparent sleeve 110. It will be understood that a road map disposed within the transparent sleeve 110 will be in tight engagement between the roller 136 and the forward space of the sleeve 110. Secured in an opening 140 in the dash 100 to the left of the viewer plate 126 is a mounting bracket 142. Extending between the mounting bracket 142 and the left journal 132 is a flexible conduit 144. Rotatably mounted within the flexible conduit 144 is a flexible cable 146 having one end thereof secured to the shaft 134 of the rubber roller 136. Secured to the other end of the flexible cable 146 is a control knob 148 which is rotatably mounted on the dash 100 forward thereof.

Secured to the dash 100 to the right of the viewer plate 126 is a conventional electrical switch 150 having a control knob 152 extending forwardly of the dash 100. The switch 150 is provided with a first terminal 154 to which is connected one end of the wire 118. The switch 150 is also provided with a second terminal 156 from which extends a wire 158 which together with the wire 116 is connected to the electrical circuit of the automobile in which the map holder 98 is mounted.

Referring to Figure 1 in particular, in will be seen that mounted within the transparent sleeve 110 is a conventional road map 160. With the road map 160 disposed within the transparent sleeve 110, the portion thereof underlying the magnifying lens 108 is enlarged and viewed through the viewer plate 126. As the vehicle proceeds along its journey, the road map 160 may be moved to a new location by roating the knob 148 which will revolve the rubber roller 136 and in turn move the road map 160 vertically with respect to the magnifying lens 108 and the viewer 126.

Although it has not been illustrated, it will be readily apparent that the road map holder 98 may be provided with a special road map (not shown) and that the roller 136 may be connected to the speedometer of a vehicle in any conventional manner so that the road map will be progressively moved as the vehicle travels along its route.

While the various portions of the road map holder have been illustrated as being formed of plastic, it will be readily understood that the portions of the map holder which need not be transparent may be formed of any suitable materials including metal.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A map holder for vehicles comprising a support, said support being adapted to slidably retain a road map, a lens rigidly secured to said support and adapted to overlie said road map, said support including a first plate having wire receiving grooves therein, second plates overlying said first plate, said second plates being disposed in a common plane and having opposed ends in abutting relation, the opposite ends of said second plates extending outwardly beyond the ends of said first plate, housings secured to said opposite ends of the second plates, said lens being secured to said housings, a transparent flat map receiving sleeve retained between said first plate and said lens, wherein the map holder is secured to the rear of a dash of a vehicle, said dash having a viewer plate mounted therein in alignment with said lens.

2. The map holder of claim 1, wherein a sleeve extends between said viewer plate and the lens.

References Cited in the file of this patent
UNITED STATES PATENTS

| | | |
|---|---|---|
| 1,430,207 | Woodhouse | Sept. 26, 1922 |
| 1,699,383 | Taylor | Jan. 15, 1929 |
| 1,759,544 | Croes | May 20, 1930 |
| 1,773,337 | Barlow | Aug. 19, 1930 |
| 2,017,597 | Howstine | Oct. 15, 1935 |
| 2,057,807 | Whitmore | Oct. 20, 1936 |
| 2,169,786 | Baum | Aug. 15, 1939 |
| 2,211,559 | Erickson | Aug. 13, 1940 |
| 2,586,723 | Sakols | Feb. 19, 1952 |

FOREIGN PATENTS

| | | |
|---|---|---|
| 313,632 | England | June 13, 1929 |
| 502,318 | France | May 11, 1920 |